(12) United States Patent
Cheng et al.

(10) Patent No.: US 9,792,328 B2
(45) Date of Patent: *Oct. 17, 2017

(54) SPLITTING OF A JOIN OPERATION TO ALLOW PARALLELIZATION

(71) Applicant: SYBASE, INC., Dublin, CA (US)

(72) Inventors: Xun Cheng, Dublin, CA (US); Peter Schneider, Dublin, CA (US)

(73) Assignee: SYBASE, INC., Dublin, CA (US)

( * ) Notice: Subject to any disclaimer, the term of this patent is extended or adjusted under 35 U.S.C. 154(b) by 402 days.

This patent is subject to a terminal disclaimer.

(21) Appl. No.: 14/210,239

(22) Filed: Mar. 13, 2014

(65) Prior Publication Data

US 2015/0261820 A1 Sep. 17, 2015

(51) Int. Cl.
*G06F 17/30* (2006.01)

(52) U.S. Cl.
CPC .............................. *G06F 17/30466* (2013.01)

(58) Field of Classification Search
CPC .................................................. G06F 17/30466
See application file for complete search history.

(56) References Cited

U.S. PATENT DOCUMENTS

| | | | |
|---|---|---|---|
| 5,121,494 A | 6/1992 | Dias et al. | |
| 5,345,585 A | 9/1994 | Iyer et al. | |
| 5,574,900 A | 11/1996 | Huang et al. | |
| 5,692,174 A | 11/1997 | Bireley et al. | |
| 5,864,842 A * | 1/1999 | Pederson | G06F 17/30445 |
| 5,960,428 A | 9/1999 | Lindsay et al. | |
| 6,009,265 A | 12/1999 | Huang et al. | |
| 6,112,198 A | 8/2000 | Lohman et al. | |
| 6,804,678 B1 | 10/2004 | Luo et al. | |
| 6,865,567 B1 * | 3/2005 | Oommen | G06F 17/30463 |
| 7,184,998 B2 | 2/2007 | Nlca | |
| 7,849,073 B2 | 12/2010 | Young-Lai | |
| 7,882,100 B2 | 2/2011 | Andrei | |
| 7,945,562 B2 | 5/2011 | Ahmed et al. | |
| 8,086,598 B1 | 12/2011 | Lamb et al. | |
| 8,126,870 B2 | 2/2012 | Chowdhuri et al. | |
| 8,161,070 B2 | 4/2012 | Dipper | |
| 8,285,709 B2 | 10/2012 | Candea et al. | |
| 8,332,389 B2 | 12/2012 | Bestgen et al. | |
| 8,370,316 B2 | 2/2013 | Bensberg et al. | |

(Continued)

OTHER PUBLICATIONS

"U.S. Appl. No. 14/210,153, Non Final Office Action dated Mar. 24, 2016", 17 pgs.

(Continued)

*Primary Examiner* — Augustine K Obisesan
*Assistant Examiner* — Lahcen Ennaji
(74) *Attorney, Agent, or Firm* — Schwegman Lundberg & Woessner, P.A.

(57) ABSTRACT

A system and method for processing a database query is described. In response to detection that a database query involves a star or snowflake join operation, a join operator in a preliminary query plan can be split into a build operator and a probe operator. The probe operator can be placed in a final query plan in the same place as the join operator in the preliminary query plan, while the build operator can be placed beneath the probe operator in the final query plan, between an exchange operator and the exchange operator's child from the preliminary query plan.

20 Claims, 15 Drawing Sheets

(56) References Cited

U.S. PATENT DOCUMENTS

| | | |
|---|---|---|
| 8,396,873 B2 | 3/2013 | Xie |
| 8,438,152 B2 | 5/2013 | Ahmed |
| 8,543,535 B2 | 9/2013 | Satpathy et al. |
| 8,671,091 B2 | 3/2014 | Cherniack et al. |
| 8,700,679 B2 | 4/2014 | Nagel et al. |
| 8,762,407 B2 | 6/2014 | Wang et al. |
| 8,793,243 B2 | 7/2014 | Weyerhaeuser et al. |
| 2005/0160102 A1 | 7/2005 | Abdo et al. |
| 2006/0288030 A1 | 12/2006 | Lawrence |
| 2007/0061288 A1 | 3/2007 | Fuh et al. |
| 2008/0033914 A1 | 2/2008 | Cherniack et al. |
| 2008/0059524 A1 | 3/2008 | Biedenstein et al. |
| 2008/0147599 A1* | 6/2008 | Young-Lai ........ G06F 17/30445 |
| 2008/0215556 A1* | 9/2008 | Surna ................ G06F 17/30424 |
| 2013/0173528 A1 | 7/2013 | Betawadkar-Norwood et al. |
| 2013/0275365 A1 | 10/2013 | Wang et al. |
| 2014/0214796 A1* | 7/2014 | Barber .............. G06F 17/30498 707/714 |
| 2015/0261819 A1 | 9/2015 | Cheng et al. |

OTHER PUBLICATIONS

"U.S. Appl. No. 14/210,153, Response filed Jun. 22, 2016 to Non Final Office Action dated Mar. 24, 2016", 11 pgs.
"U.S. Appl. No. 14/210,153, Final Office Action dated Oct. 7, 2016", 10 pgs.
"U.S. Appl. No. 14/210,153, Non Final Office Action dated Jan. 13, 2017", 10 pgs.
"U.S. Appl. No. 14/210,153, Response filed Dec. 12, 2016 to Final Office Action dated Oct. 7, 2016", 11 pgs.
U.S. Appl. No. 14/210,153, filed Mar. 13, 2014, Star and Snowflake Join Query Performance.

\* cited by examiner

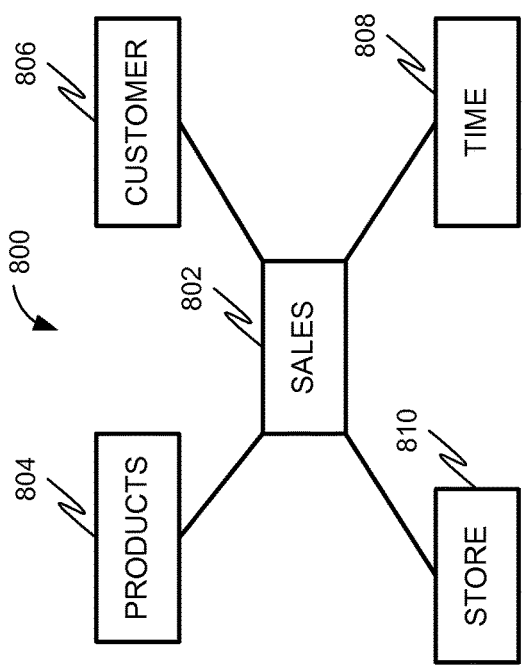

```
                    ┌─ 812
SELECT
    store.sales_district,
    time.fiscal_period,
    SUM(sales.dollar_sales) revenue,
    SUM(dollar_sales) - SUM(dollar_cost) income
FROM
    sales, store, time, product
WHERE
    sales.store_key = store.store_key AND
    sales.time_key = time.time_key AND
    sales.product_key = product.product_key AND
    time.fiscal_period IN ('3Q95', '4Q95', '1Q96') and
    product.department = 'Grocery' AND
    store.sales_district IN ('San Francisco', 'Los Angeles')
GROUP BY
    store.sales_district, time.fiscal_period;
```

SPLITTING OF A JOIN OPERATION TO ALLOW PARALLELIZATION

TECHNICAL FIELD

This document generally relates to methods and systems for use with databases or data processing software. More particularly, this document relates to improvements to splitting of a join operation to allow parallelization.

BACKGROUND

A star schema is a type of database organization where one or more fact tables reference a number of dimension tables. A fact table typically records measurements or metrics for an event, and includes values and foreign keys to dimension tables where descriptive information is stored. The star schema gets its name from the physical model's resemblance to a star with a fact table at its center and the dimension tables surrounding the fact table representing the star's points. The star schema is a specialized form of a snowflake schema, which also has fact tables, but in the snowflake schema, dimensions are normalized into multiple related tables, whereas the star schema's dimensions are denormalized with each dimension represented by a single table.

Fact tables often include a low level of granularity, which often results in fact tables growing quite large over time. When performing a database query on a database using a star or snowflake schema, a join operation is typically performed on a fact table and one or more of the dimension tables. Due to the size of the fact tables, however, such join operations can be very time and processor-intensive.

BRIEF DESCRIPTION OF DRAWINGS

The present disclosure is illustrated by way of example and not limitation in the figures of the accompanying drawings, in which like references indicate similar elements and in which:

FIG. 8A is a block diagram illustrating a star join schema in accordance with an example embodiment.

FIG. 8B is a diagram illustrating a sample query.

DETAILED DESCRIPTION

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter can be practiced without these specific details. In general, well-known instruction instances, protocols, structures, and techniques have not been shown in detail.

In an example embodiment, the efficiency of the processing of queries utilizing star join or snowflake join is improved through various techniques. A join operation (hereinafter also referred to as a join) combines records from two or more tables in a database. In one example embodiment, the dimension tables are ordered by their restrictiveness. The restrictiveness of a dimension table can generally be defined as an indication of how many rows will likely be obtained via a join between the dimension table and the fact table, in comparison to other dimension tables. The fewer rows that will likely be obtained through such a join operation, the more restrictive the dimension table is. The join operations involved in the star join or snowflake join are then reordered such that the dimension tables closer to the fact table in the star join or snowflake join are the most restrictive. This results in fewer rows needed to be joined overall, thus improving the efficiency of the star join or snowflake join.

In another example embodiment, the join operations involved in the star join or snowflake join can each be split into two operations: a probe and a build. The build operation can then be placed lower in the execution plan for each dimension table. This allows the build operation to be run by a different thread from the probe operation, speeding up overall execution time through parallelization. This also allows the build operation to be performed on each dimension table independently, as opposed to on joins of dimension tables, which reduces the number of overall operations to be executed.

In another example embodiment, a combination of these techniques can be used to synergistically further improve efficiency of the processing of queries utilizing star join or snowflake join operations.

Figure 1:
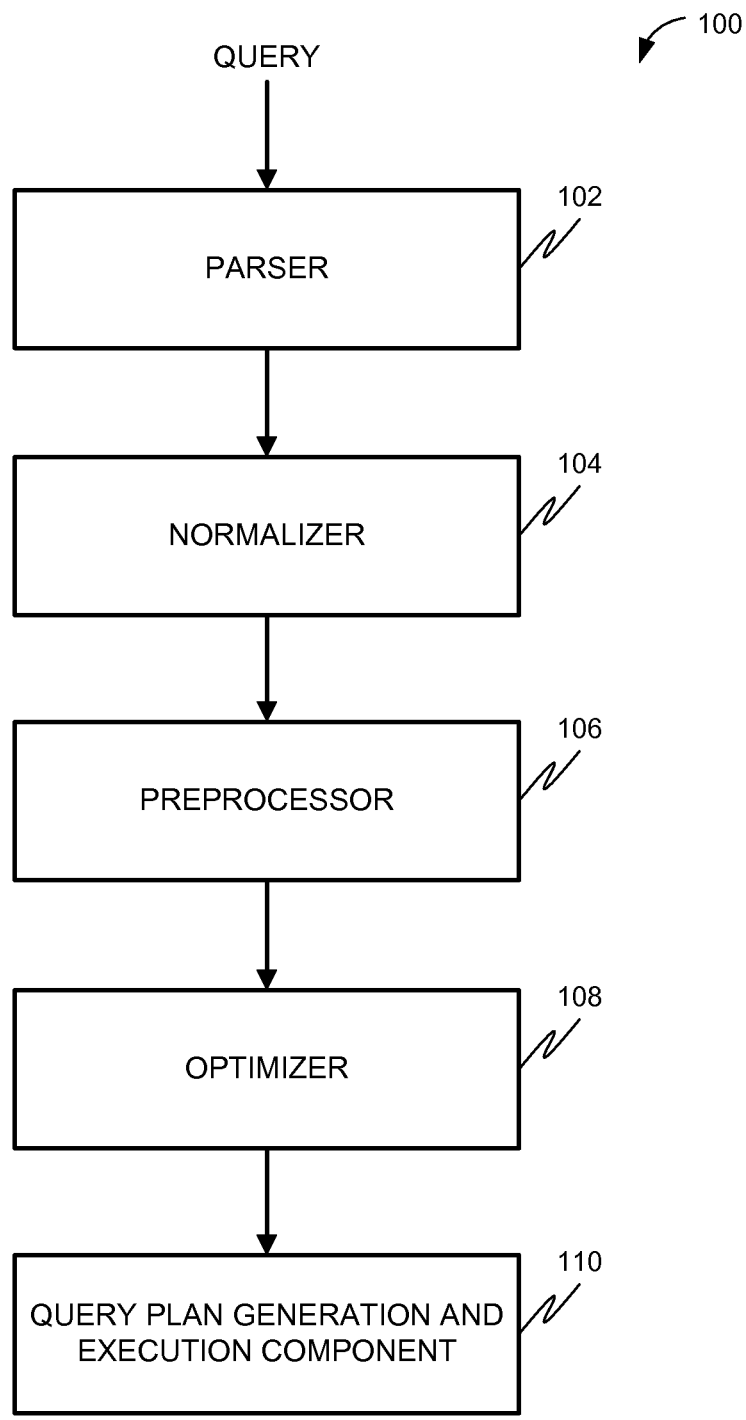
FIG. 1 is a block diagram illustrating a system, in accordance with an example embodiment, for processing a database query.

FIG. 1 is a block diagram illustrating a system 100, in accordance with an example embodiment, for processing a database query. In some embodiments the database can be a part of a relational database management system (RDBMS). The RDBMS can include one or more data servers and one or more backup servers. Each data server includes system databases and user databases. The system 100 can include one or more machines (e.g., server computers, etc.). In some embodiments, the RDBMS includes a single process multithreaded data server application. The system depicted in FIG. 1 can be embodied on a single data server.

The system includes a parser 102, which can parse an incoming database query. In some example embodiments, the incoming database query is in the form of a structured query language (SQL) query, which makes the parser 102 a SQL parser. A normalizer 104 then can normalize the parsed query. A preprocessor 106 can then prepare the normalized parsed query for optimization. This can include, for example, organizing the data in the normalized parsed query in a manner that makes it efficient to develop a query plan from.

An optimizer 108 then can develop a query plan based on the normalized parsed query and optimize that query plan. The optimizer 108 can improve the processing of queries utilizing star join or snowflake join. The components of the optimizer 108 will be described in more detail in the discussion of FIG. 2 below. The result of the optimizer 108 can be, in situations where a star join or snowflake join was being attempted, a star join or snowflake join optimizer plan. For example, when creating the star join or snowflake join optimizer plan, the optimizer 108 can order the joins based on restrictiveness.

The star join or snowflake join optimizer plan can then be utilized by a query plan generation and execution component 110, which can implement the plan. The query plan generation and execution component 110 can split join operations to allow for parallelization. For example, the query plan generation and execution component 110 can split the join operation for each of the dimension tables into a probe operation and a build operation. The build operation for each dimension table can be run by a different thread and in parallel, speeding up the overall execution time. The build operation can also be performed on each dimension table independently and not on joins of the dimension tables, which reduces the amount of overall operations. The components of the query plan generation and execution component 110 will be described in more detail in the discussion of FIG. 3 below.

Figure 2:
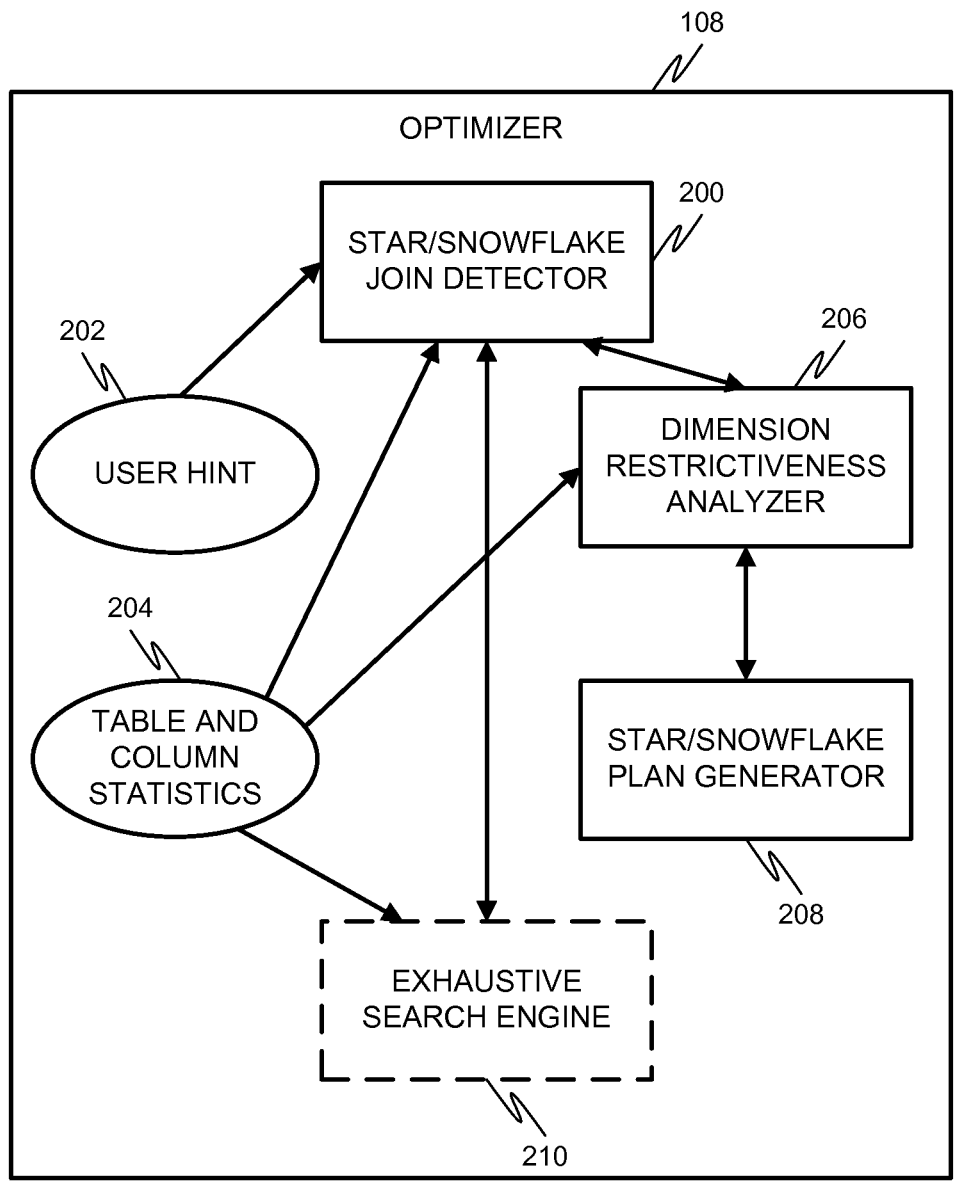
FIG. 2 is a block diagram illustrating an optimizer, in accordance with an example embodiment.

FIG. 2 is a block diagram illustrating an optimizer 108, in accordance with an example embodiment. This optimizer 108 is presented as being used in the system of FIG. 1, although it should be noted that in some example embodiments the optimizer 108 of FIG. 2 could be used in a different system than the one in FIG. 1.

A star/snowflake join detector 200 can detect star joins and/or snowflake joins in the normalized parsed query. This can include utilizing user input (e.g., a user hint 202) that is received as to which table is the central fact table. The central fact table is a fact table at the center of a star or snowflake schema. In such an instance, the star/snowflake join detector 200 can examine the configuration of the tables in the normalized parsed query and determine if, for example, the non-fact tables (e.g., dimension tables) form a star join or snowflake configuration around the fact table specified by the user hint 202. The star/snowflake join detector 200 can utilize table and column statistics 204 in this analysis. It should be noted that in some example embodiments, the star/snowflake join detector 200 can be designed to automatically detect, or at least infer, which table is the central fact table, eliminating the need for the user hint 202.

A dimension restrictiveness analyzer 206 can then analyze the restrictiveness of each of the dimension tables. In an example embodiment, the dimension restrictiveness analyzer 206 analyzes the restrictiveness of all of the tables but the central fact table. The dimension restrictiveness analyzer 206 can utilize the table and column statistics 204 in this analysis. A star/snowflake plan generator 208 can then generate an optimized star/snowflake join query plan in light of the information learned by the dimension restrictiveness analyzer 206. This can include, for example, ordering the joins based on the restrictiveness of the dimension tables, with the joins closer to the fact table being for the dimension tables having the highest restrictiveness. An exhaustive search engine 210, which in the prior art was used to determine an optimum query plan, can be avoided here as the star/snowflake plan generator 208 can generate the optimized star/snowflake join query plan without needing to rely on an exhaustive search engine search. The exhaustive search engine 210 is included here, however, as it can still be used in cases where the query does not involve a star join or snowflake join.

Figure 3:
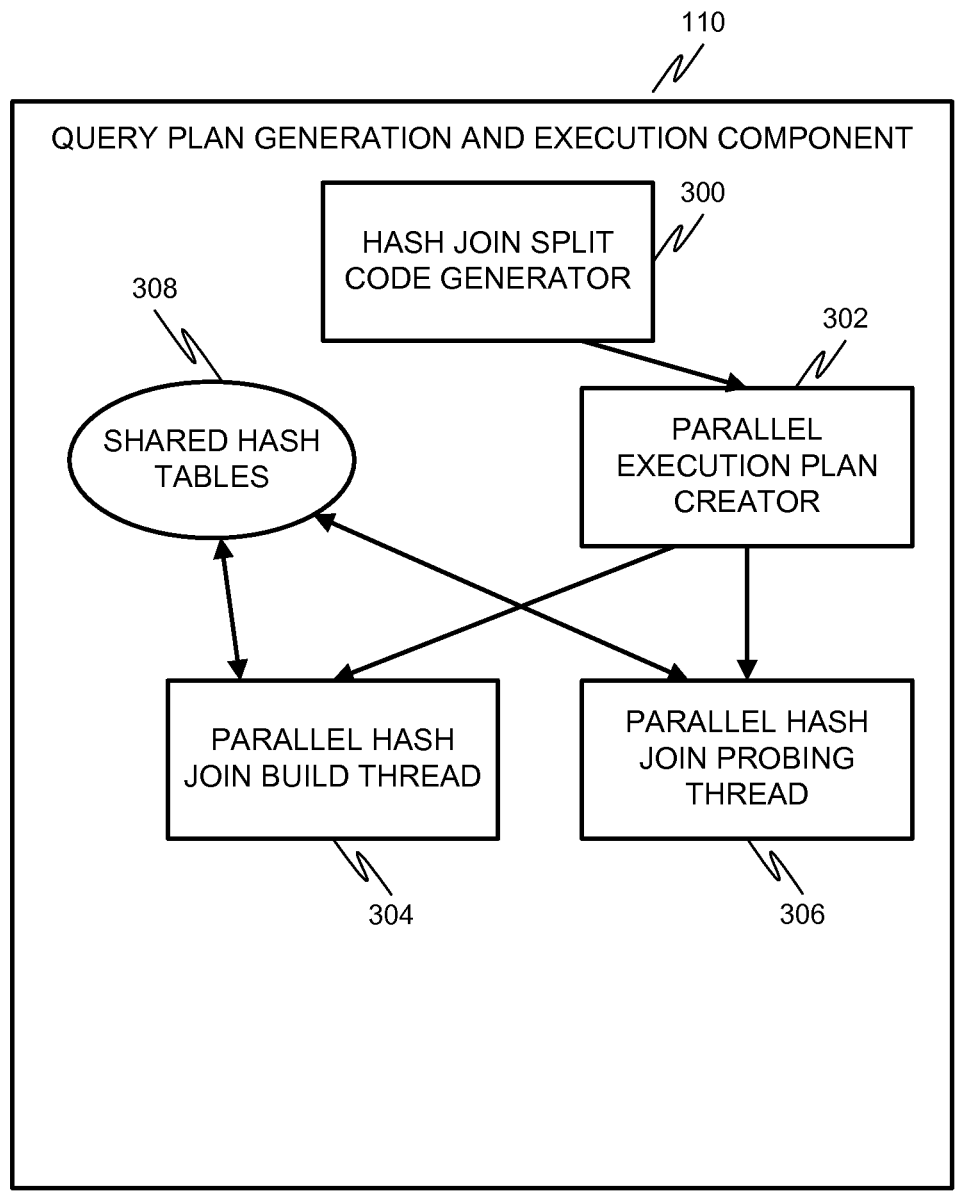
FIG. 3 is a block diagram illustrating a query plan generation and execution component in accordance with an example embodiment.

FIG. 3 is a block diagram illustrating a query plan generation and execution component 110 in accordance with an example embodiment. This query plan generation and execution component 110 is presented as being used in the system of FIG. 1, although it should be noted that in some example embodiments the query plan generation and execution component 110 of FIG. 3 could be used in a different system than the one in FIG. 1.

The query plan generation and execution component 110 can include a hash join split code generator 300, which can split any hash join commands in a query plan into, for example, a probe command and a build command, and can move the build command lower in the query plan. It should be noted that the query plan being split in this manner can be, in some example embodiments, a query plan split by an optimizer, such as the optimizer 108 of FIG. 2, but it is not necessary that the query plan be optimized to take advantage of the query plan generation and execution component 110. A parallel execution plan creator 302 can then create a parallel execution plan for this query plan, which, when executed, can be operated by a parallel hash join build thread 304 and a parallel hash join probing thread 306 in parallel, with both the parallel hash join build thread 304 and the parallel hash join probing thread 306 sharing a set of shared hash tables 308.

In an example embodiment, the system can detect which of a number of tables specified by a query is the fact table. This can be performed in a number of different ways. In one example embodiment, the user can specify which table is the fact table. This can be accomplished via user input, also known as a user hint 202. In another example embodiment, the system can perform an analysis of the specified tables to determine which one is the fact table. This can utilize information such as the size of the table, information stored in the table, organization of the table, etc. to determine which one is the fact table.

Once the fact table is determined, it can be assumed that the other tables are dimension tables.

The system may then attempt to help the optimizer 108 come up with a better plan for a star join or snowflake join query. The fact table can be placed at the innermost probing side in the query plan and the most restrictive dimension joins (e.g., the ones that include the most restrictive dimension tables) can be placed closer to the fact table access in the query plan. This essentially forces the query plan generation and execution component 110 to choose a left deep hash join based on the detected star join shape using the selectivities between dimensions and the central fact table, for either the full joins or part of the joins. Selectivity is essentially the opposite of restrictiveness, which is described in more detail below.

Figure 4:
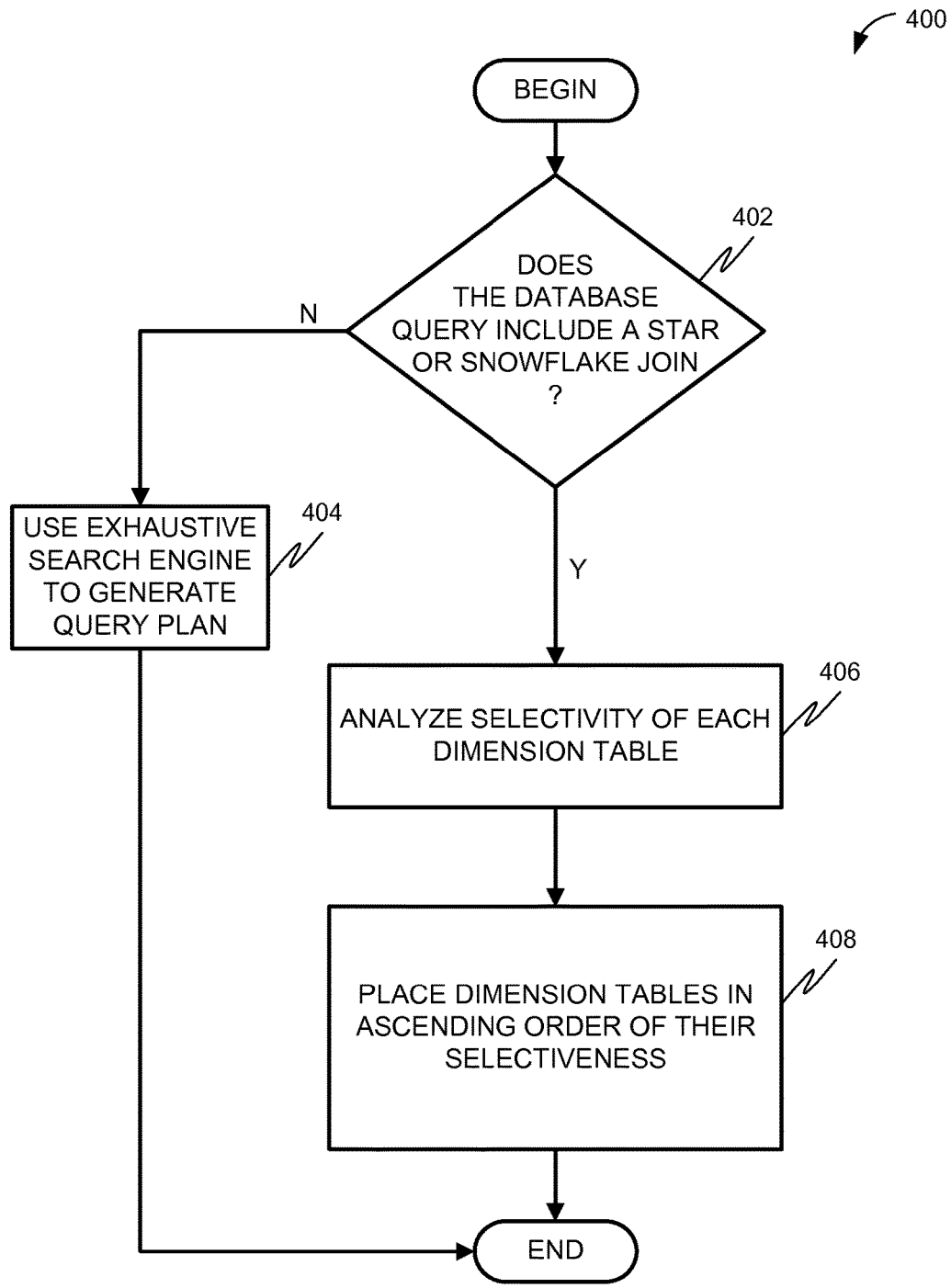
FIG. 4 is a flow diagram illustrating a method, in accordance with an example embodiment, of optimizing a database query.

FIG. 4 is a flow diagram illustrating a method 400, in accordance with an example embodiment, of optimizing a database query. Method 400 can be performed by processing logic that can comprise hardware (e.g., circuitry, dedicated logic, programmable logic, microcode, etc.), software (e.g., instructions run on a processing device), or a combination thereof. In one example implementation, the method 400 is performed by the optimizer 108 of FIG. 1, as described merely by way of example above. At operation 402, it is determined if the database query includes a star join or snowflake join. A star join or snowflake join involves the joining of a fact table with a plurality of dimension tables. If not, then at operation 404, an exhaustive search engine 210 can be used to generate a query plan based on the database query. If so, then at operation 406 the selectivity of each dimension table can be analyzed. Selectivity is essentially the opposite of restrictiveness, and this analysis will be described in more detail below. Then, at operation 408, the dimension tables are placed in ascending order of their selectiveness, after the fact table, in a query plan.

Figure 5:
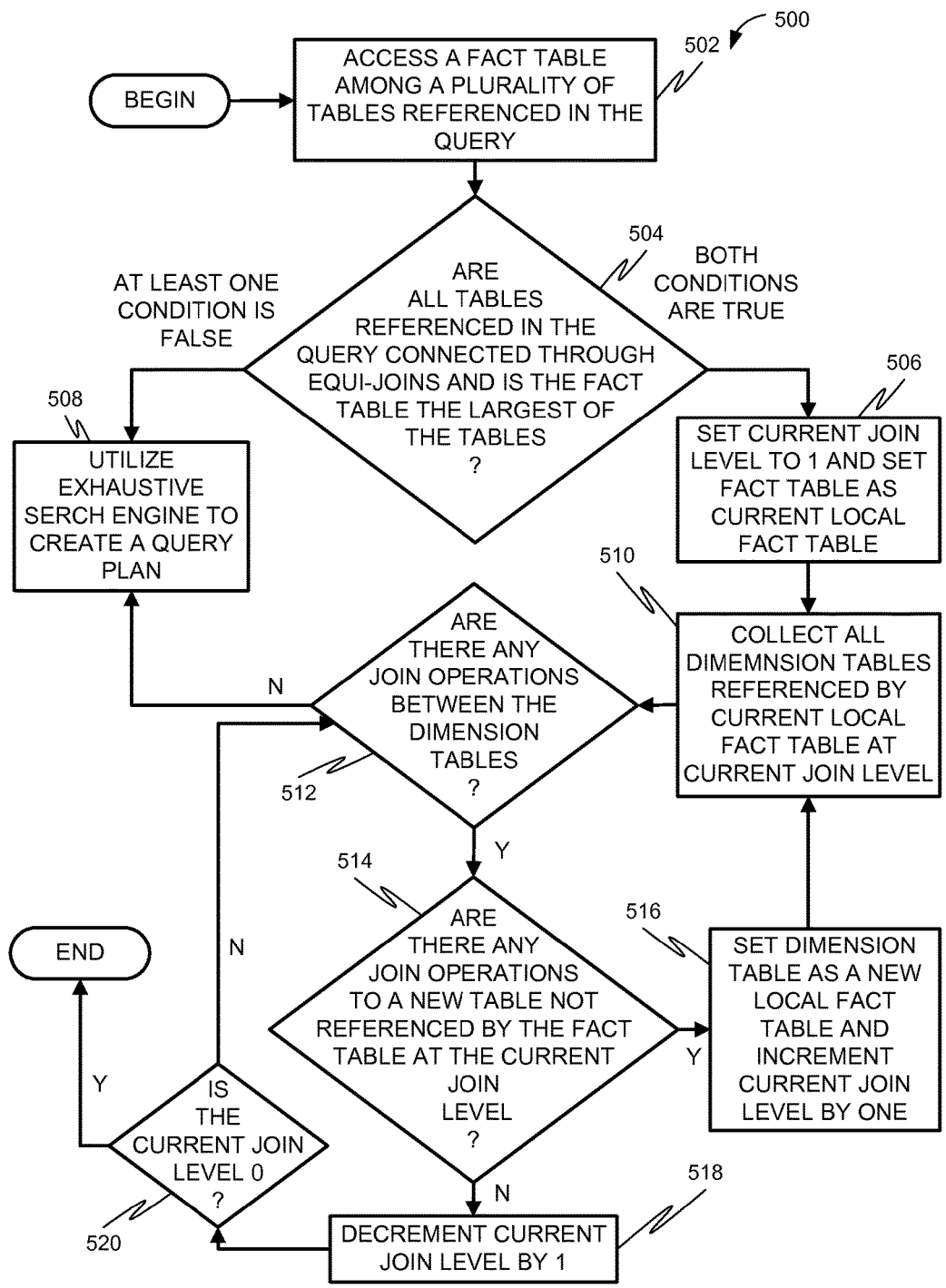
FIG. 5 is a flow diagram illustrating a method, in accordance with an example embodiment, of detecting a star or snowflake join in a query.

As described above, prior to engaging in any optimization based on a star join or snowflake join, the system can attempt to detect whether a star join or snowflake join is present in a received query. FIG. 5 is a flow diagram illustrating a method 500, in accordance with an example embodiment, of detecting a star join or snowflake join in a query. Method 500 can be performed by processing logic that can comprise hardware (e.g., circuitry, dedicated logic, programmable logic, microcode, etc.), software (e.g., instructions run on a processing device), or a combination thereof. In one example implementation, the method 500 is performed by the star/snowflake join detector 200 of FIG. 2, as described merely by way of example above.

In some example embodiments, this method 500 can be performed at operation 402 in FIG. 4. At operation 502, a fact table among a plurality of tables referenced in the query can be accessed. As described earlier, this can be accessed by receiving user input (e.g, user hint 202) as to which table is the fact table, or this detection can be performed automatically by the system. At operation 504, it can be determined if all the tables referenced in the query are connected through equi-joins and the fact table is the largest of the tables referenced in the query. An equi-join is an operation that combines two or more tables based on a column that is common to the tables. If either condition is false, then the query does not involve a star join or snowflake join, and the system progresses to operation 508, where an exhaustive search engine 210 is utilized to create a query plan. If both of the conditions determined at operation 504 are true, then the current join level (n) can be set to 1 and the fact table is set as the current local fact table at operation 506

Assuming the flow reached operation 506, then it will continue to operation 510, where all the dimension tables referenced by the current local fact table at the current join level (n) are collected. Then, at operation 512, it is determined whether there are any join operations between the dimension tables. If so, then the query does not involve a star join or snowflake join, and the flow progresses to operation 508. If not, then at operation 514 each dimension table referenced by the current local fact table at the current join level (n) is traversed to determine if any are joins to a new table not referenced by the fact table at the current join level (n). If so, then at operation 516 the dimension table is set as a new local fact table and the current join level is incremented by one (e.g., set to n+1). The flow then returns to operation 510, which repeats for the new current star level and new current local fact table. If at operation 514 it is determined that there are no dimension tables referenced by the current local fact table at the current join level, then at operation 518, the current join level is decremented by one (return to the previous current join level). Then, at operation 520 it is determined if the current join level is 0. If so, then a star join or snowflake join has been detected. If not, then an additional snowflake check needs to be performed at the previous level and the flow returns to operation 512.

Figure 6:
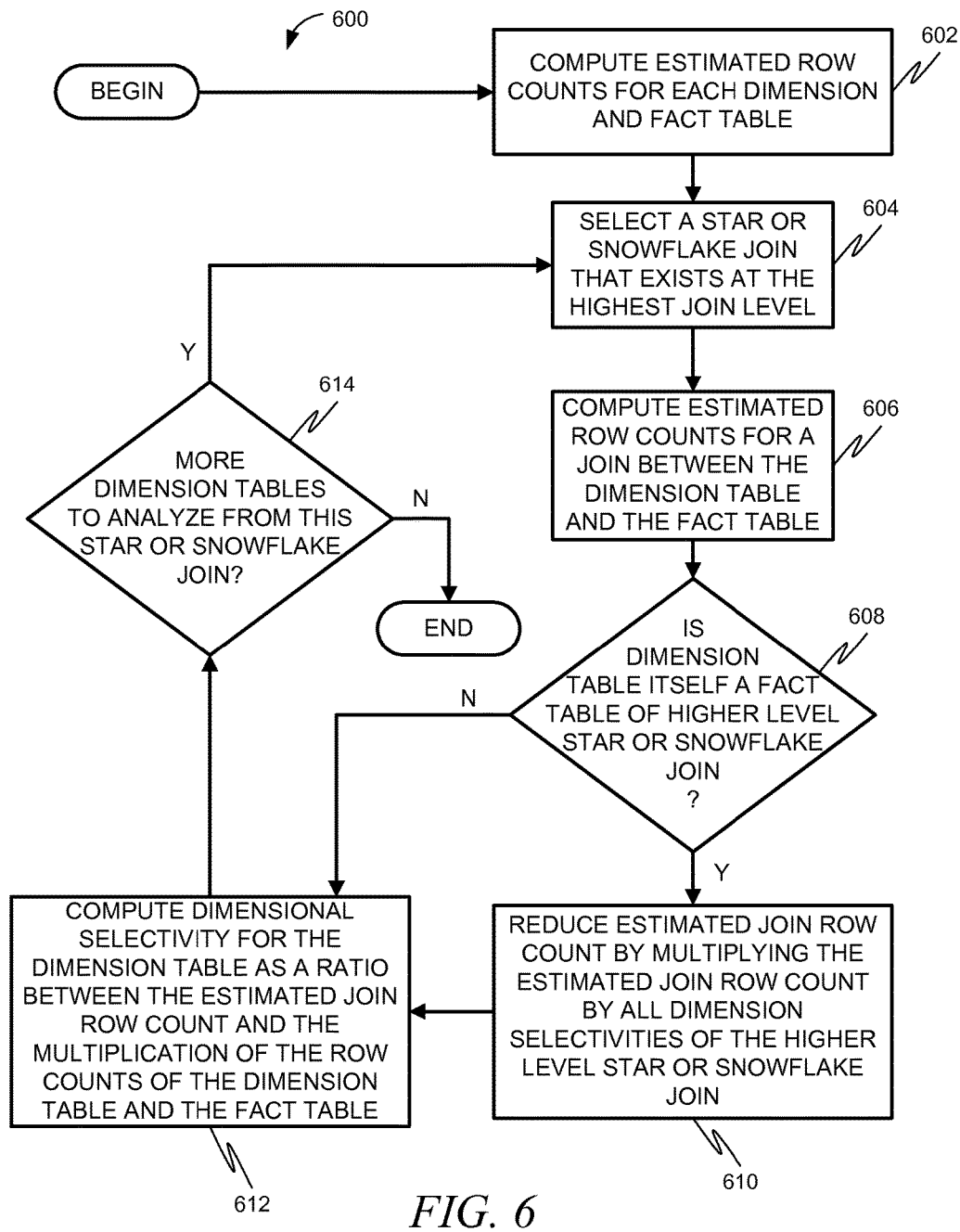
FIG. 6 is a flow diagram illustrating a method, in accordance with an example embodiment, of analyzing the selectivity of each dimension table.

FIG. 6 is a flow diagram illustrating a method 600, in accordance with an example embodiment, of analyzing the selectivity of each dimension table. Method 600 can be performed by processing logic that can comprise hardware (e.g., circuitry, dedicated logic, programmable logic, microcode, etc.), software (e.g., instructions run on a processing device), or a combination thereof. In one example implementation, the method 600 is performed by the dimension restrictiveness analyzer 206 of FIG. 2, as described merely by way of example above. In some example embodiments, this method 600 can be performed at operation 406 in FIG. 4. At operation 602, estimated row counts for each dimension and fact table (including search clause(s)) can be computed. At operation 604, a star join or snowflake join that exists at the highest join level can be selected. A loop can then be begun for each dimension table. At operation 606, estimated row counts for a join between the dimension table and the fact table can be computed. At operation 608, it can be determined if the dimension table is itself also a fact table of a higher level star join or snowflake join. If so, then at operation 610 the estimated join row count is reduced by multiplying the estimated join row count by the dimension selectivities (e.g., all of the dimension selectivities) of the higher level star join or snowflake join. Then, or if at operation 608 it was determined that the dimension table was not itself also a fact table of a higher level star join or snowflake join, the flow can progress to operation 612. At operation 612, dimensional selectivity for the dimension table is computed as a ratio between the estimated join row count and the row count of the fact table. This represents how restrictive the dimension is within the dimension's star join or snowflake join level. The lower the selectivity ratio, the more restrictive the dimension table is. Then, at operation 614, it is determined if there are any more dimension tables to analyze from this star join or snowflake join. If so, then the process iterates back to operation 606 for the next dimension table to analyze.

Figure 7:
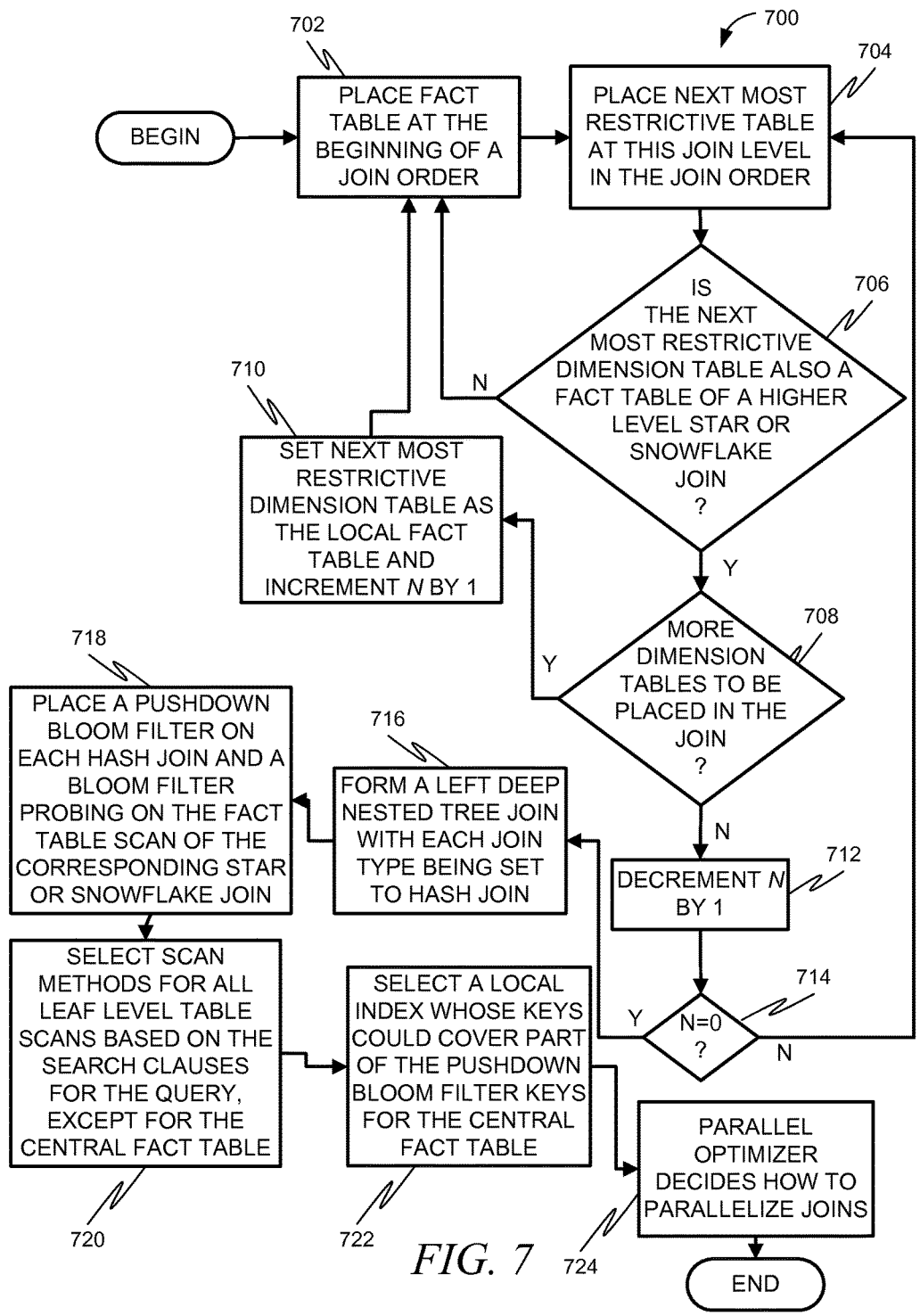
FIG. 7 is a flow diagram illustrating a method, in accordance with an example embodiment, of placing dimension tables in ascending order of their selectiveness, after the fact table, in a query plan.

FIG. 7 is a flow diagram illustrating a method 700, in accordance with an example embodiment, of placing dimension tables in ascending order of their selectiveness, after the fact table, in a query plan. Method 700 can be performed by processing logic that can comprise hardware (e.g., circuitry, dedicated logic, programmable logic, microcode, etc.), software (e.g., instructions run on a processing device), or a combination thereof. In one example implementation, the method 700 is performed by the star/snowflake plan generator 208 of FIG. 2, as described merely by way of example above. In some example embodiments, this method 700 can be performed at operation 408 in FIG. 4.

At operation 702, starting with the join level n=1 and the fact table determined by the system (e.g., the one hinted at by the user), the fact table is placed at the beginning of a join order. Then at operation 704, the next most restrictive table at this join level is placed in the join order (if this is the first time through the loop, this will be the most restrictive of the dimension tables). At operation 706, it is determined if this next most restrictive dimension table is also a fact table of a higher-level star join or snowflake join. If so, then at operation 708, it is determined if there are any more dimension tables to be placed in the join. If so, then at operation 710 the next most restrictive dimension table is set as the local fact table and n is incremented by 1. Then the process loops back to operation 702. The looping back to operation 702 also occurs if the system determines at operation 706 that this next most restrictive dimension table is not also a fact table of a higher level star join or snowflake join. The process continues to loop through all the dimension tables to be placed in the join.

If at operation 708 it is determined that there are no more dimension tables to be placed in the join, then at operation 712 the process can return to the previous star join or snowflake join level by decrementing n by 1. Then at operation 714 it is determined if n=0. If not, then the process loops back to operation 704 at this decremented level n. If so, then join ordering is complete and at 716 the system forms a left deep nested tree join with each join type being set to hash join. The left child of each join is a hash join probe side while the right child of each join is the build side. Then, at operation 718, a pushdown bloom filter is placed on each hash join and the bloom filter probing is placed on the fact table scan of the corresponding star join or snowflake join. At operation 720, the scan methods for all leaf level table scans can be selected based on the search clauses for the query, except for the central fact table.

At operation 722, for the central fact table, a local index is selected whose keys could cover part of the pushdown bloom filter keys. If there is no such index or the minimum dimension selectivity for the central fact table, for example, is above 0.01, the scan method for the central fact table can be chosen based on the search clauses in the query At operation 724, a parallel optimizer decides how to parallelize the joins based on the partitions of the central fact table and the available system resources.

Figure 8D:
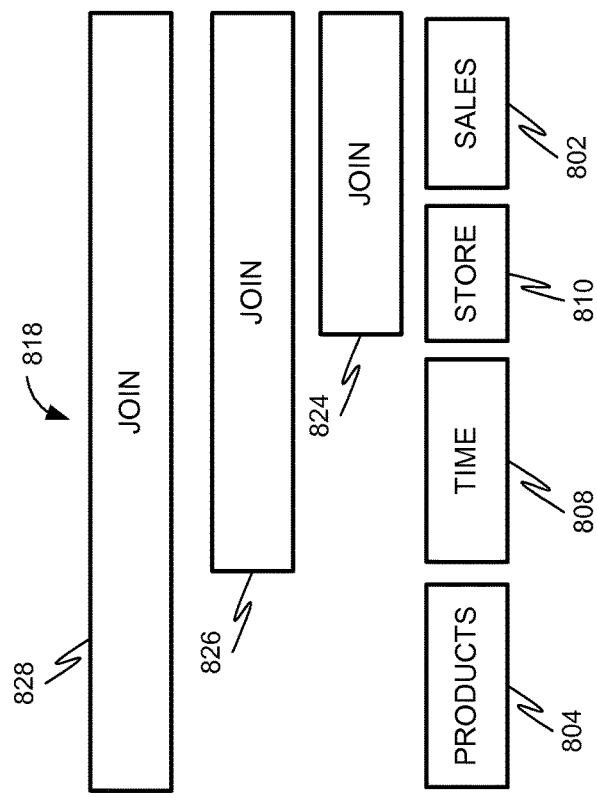
FIG. 8D is a diagram illustrating a query plan created using the techniques described in FIGS. 4-7 and the corresponding text.
Figure 8C:
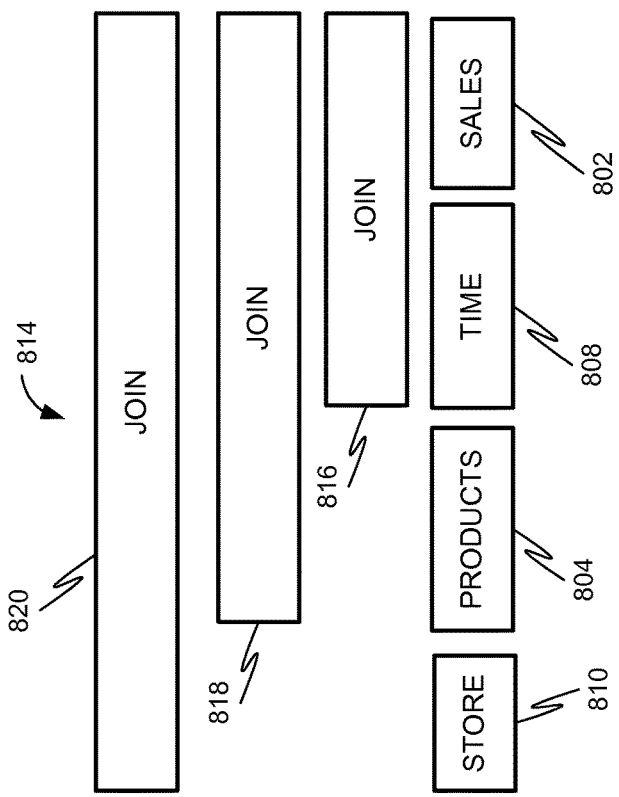
FIG. 8C is a diagram illustrating a typical query plan based on the sample query.

An example will now be provided to help illustrate the functionality of the techniques described in FIGS. 4-7 and the corresponding text. This is merely an example and is not intended to be limiting. FIG. 8A is a block diagram illustrating a star join schema 800 in accordance with an example embodiment. The star join schema 800 can include a fact table 802 (e.g., sales), and a plurality of dimension tables 804, 806, 808, 810 (e.g., products, customer, time, and store, respectively). FIG. 8B is a diagram illustrating a sample query 812. FIG. 8C is a diagram illustrating a typical query plan 814 based on the sample query 812. It should be noted that this is a simplified version of a query plan 814 showing just the join operations and showing the query plan 814 in graphical form. This query plan 814, when executed, will result in a join 816 between sales (fact table 804) and time (dimension table 806) and then a join 818 between that result and products (dimension table 808), and then a join 820 between that result and store (dimension table 810).

Assume, however, that dimension table 810 is more restrictive than dimension table 806, which is more restrictive than dimension table 808. FIG. 8D is a diagram illustrating a query plan 818 created using the techniques described in FIGS. 4-7 and the corresponding text. As can be seen, the join operations 824, 826, 828 are in a different order than in FIG. 8C, due to the ordering of the joins based on restrictiveness of the corresponding dimension tables 804-810.

Given that the central fact table in a star join or snowflake join can be partitioned and the dimension tables are relatively much smaller, the star/snowflake join plan generated above often replicates the dimension tables and joins each copy with one of the central fact table's partition. In another example embodiment, a hash join split code generator 300 can recognize such a plan and divide each hash join operator into two separate operators: a hash join build and a hash join probe. Furthermore, the hash join build operator can be pushed underneath the replications operator so that the build on the dimension table happens once and its resultant hash table could be shared among multiple hash join probing threads. This also gives the system the opportunity to start the builds (e.g., all of the builds) concurrently, with the central fact table access started sooner when the pushdown bloom filters (e.g., all of the pushdown bloom filters) are ready from the concurrent builds.

Figure 9:
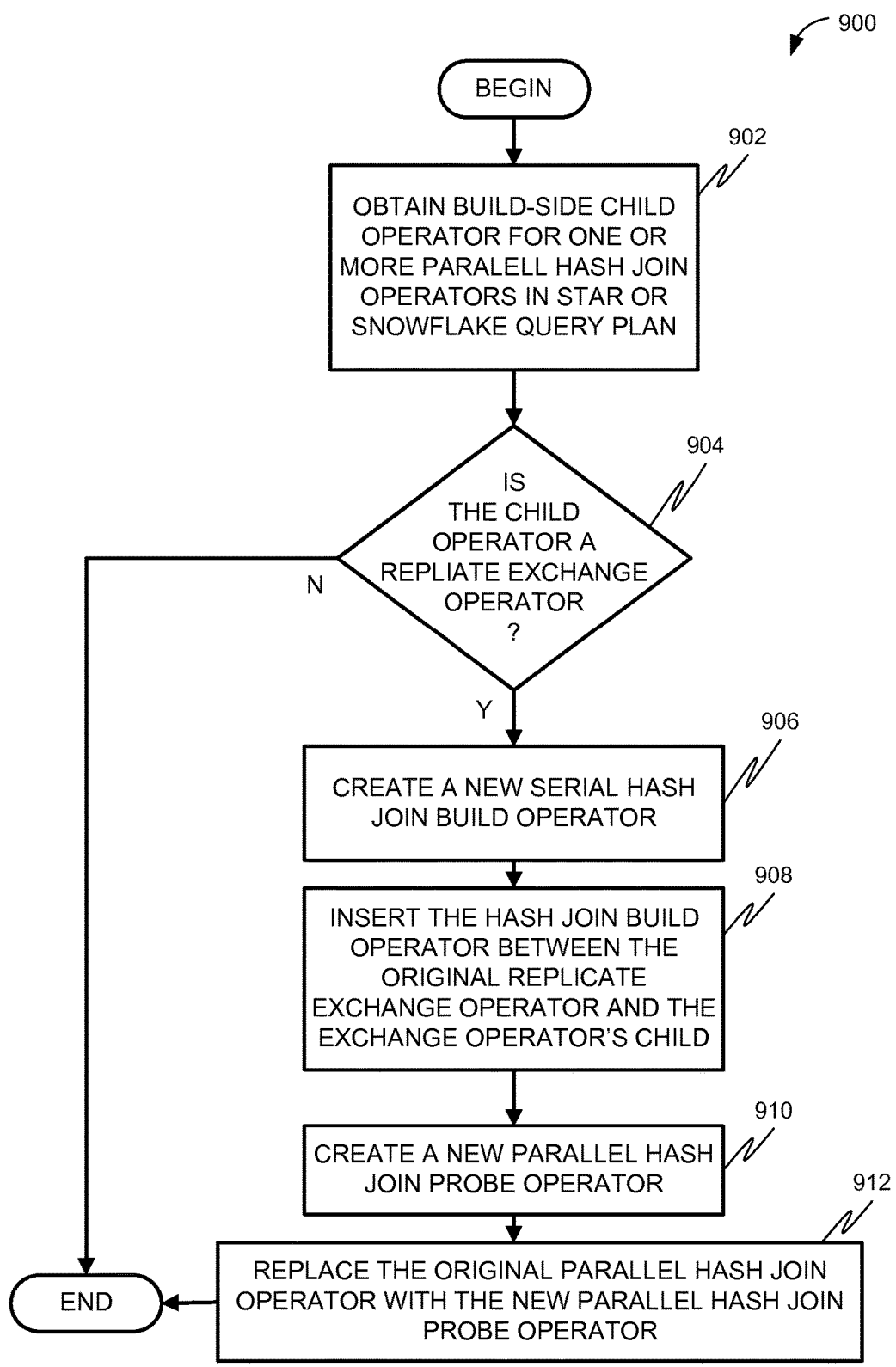
FIG. 9 is a flow diagram illustrating a method, in accordance with an example embodiment, of splitting a hash join operator in a star or snowflake query plan.

As stated earlier, this embodiment can be used in conjunction with the ordered joins described in FIGS. 4-7 and the corresponding text, although in some embodiments it can be utilized independently. FIG. 9 is a flow diagram illustrating a method 900, in accordance with an example embodiment, of splitting a hash join operator in a star join or snowflake query plan. Method 900 can be performed by processing logic that can comprise hardware (e.g., circuitry, dedicated logic, programmable logic, microcode, etc.), software (e.g., instructions run on a processing device), or a combination thereof. In one implementation, the method 900 is performed by the query plan generation and execution component 110 of FIG. 1, as described above.

At operation 902, for one or more parallel hash join operators in the star join or snowflake query plan, its build-side child operator is obtained. Then, at operation 904, it is determined if the child operator is a replicate exchange operator. If not, then no splitting occurs and the process ends. If so, then at operation 906, a new serial hash join build operator is created. Then, at operation 908, the hash join build operator is inserted in between the original replicate exchange operator and the exchange operator's child.

At operation 910, a new parallel hash join probe operator is created. At operation 912, the original parallel hash join operator is replaced with the new parallel hash join probe operator.

After the hash join operator is split into two operators, the build operators pushed underneath the replicate exchange operator can be started in parallel. For snowflake schemas, tables belonging to a single dimension could be joined to the local fact table. The parallel hash join builds then can track the potential dependencies within a single dimension and synchronize the concurrent builds.

Figure 10:
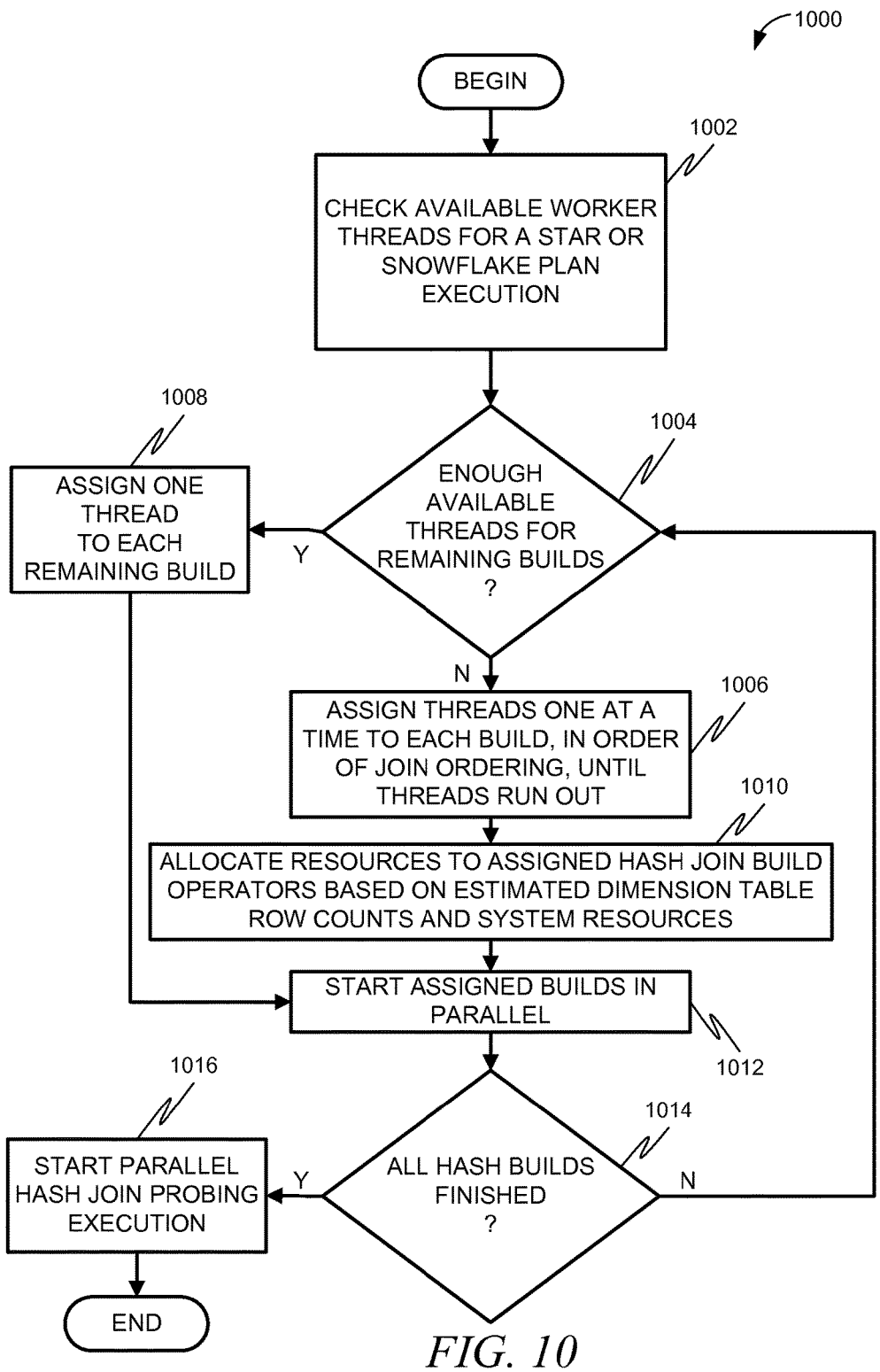
FIG. 10 is a flow diagram illustrating a method, in accordance with an example embodiment, of executing a parallel hash join build.

FIG. 10 is a flow diagram illustrating a method 1000, in accordance with an example embodiment, of executing a parallel hash join build. Method 1000 can be performed by processing logic that can comprise hardware (e.g., circuitry, dedicated logic, programmable logic, microcode, etc.), software (e.g., instructions run on a processing device), or a combination thereof. In one example implementation, the method 1000 is performed by the parallel execution plan creator 302 of FIG. 3, as described merely by way of example above.

At operation 1002, the available worker threads in the system are checked for a star join or snowflake join plan execution. At operation 1004, it is determined if there are enough threads for all of the remaining builds (one for each build). If not, then at operation 1006 starting with the next build in a join ordering (such as the reverse join ordering established in the process described in FIGS. 4-7 and the corresponding text), one thread is assigned to each build until the threads run out. If there are enough workers for all the remaining builds, then one thread can be assigned to each build at operation 1008. At operation 1010, resources can be allocated to all the assigned hash join build operators based on estimated dimension table row counts and available system resources. Then, at operation 1012, the assigned builds can be started in parallel. Each build can create a hash table for its intended join. Each build can also build the bit vector for the join's pushdown bloom filter. If a build depends on a pushdown bloom filter probing from some earlier join(s), it can wait until all the bloom filter bit vectors are ready.

At operation 1014, it is determined if all the hash join builds are finished. If not, the process loops back to operation 1004. If so, then at operation 1016, a parallel hash join probing execution is started. The hash table addresses and the bloom filter bit vector addresses can be passed across the replicate exchange operators, to be used by the parallel hash join probing.

Once all the builds are finished, the hash join probing operators can process in multiple threads dividing the remaining work along the partitions of the central fact table, after most fact table rows are disqualified by the pushdown bloom filters.

Figure 11:
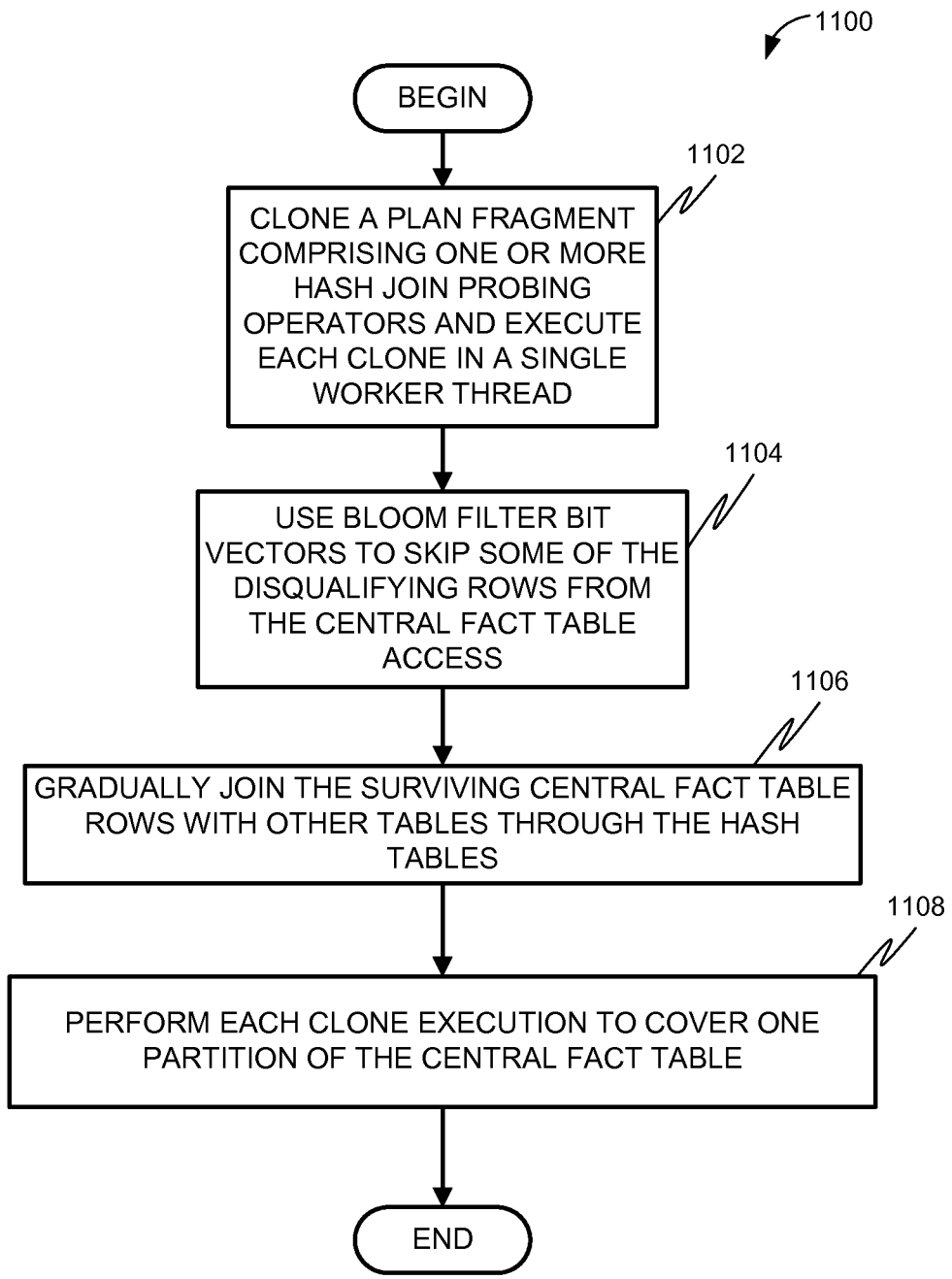
FIG. 11 is a flow diagram illustrating a method, in accordance with an example embodiment, of executing a parallel hash join probe.

FIG. 11 is a flow diagram illustrating a method 1100, in accordance with an example embodiment, of executing a parallel hash join probe. Method 1100 can be performed by processing logic that can comprise hardware (e.g., circuitry, dedicated logic, programmable logic, microcode, etc.), software (e.g., instructions run on a processing device), or a combination thereof. In one example implementation, the method 1100 is performed by the parallel execution plan creator 302 of FIG. 3, as described merely by way of example above.

At operation 1102, a plan fragment comprising one or more hash join probing operators are cloned and each clone is executed in a single worker thread, using shared hash tables and bloom filter bit vectors. At operation 1104, the bloom filter bit vectors are used to skip some (if not most) of the disqualifying rows from the central fact table access. At operation 1106, the surviving central fact table rows are gradually joined with other tables through all the hash tables. At operation 1108, each clone execution is performed to cover one partition of the central fact table.

Figure 12B:
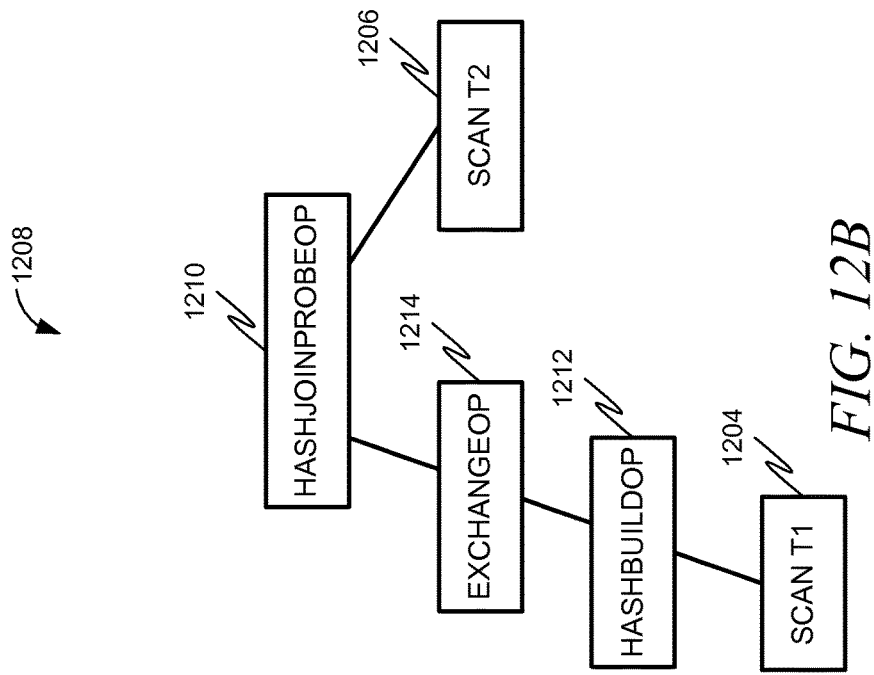
FIG. 12B is an example of a query plan created using the technique described in FIGS. 8-10 and the corresponding text.
Figure 12A:
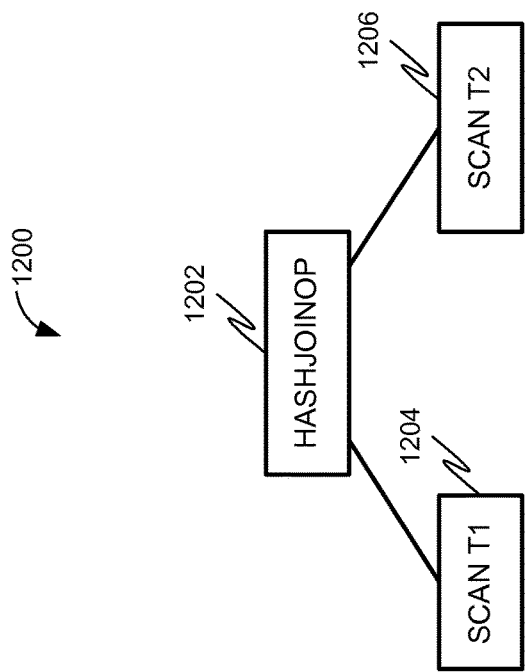
FIG. 12A is an example of a query plan created without using the technique described in FIGS. 9-11 and the corresponding text.

This functionality can be represented by an example. FIG. 12A is an example of a query plan 1200 created without using the technique described in FIGS. 9-11 and the corresponding text. The query plan 1200 includes a hash join operation 1202 having child nodes for operators to scan t1 1204 and scan t2 1206. FIG. 12B is an example of a query plan 1208 created using the technique described in FIGS. 8-10 and the corresponding text. Here, the hash join operator 1202 from FIG. 12A has been replaced by a hash join probe operator 1210 and a hash build operator 1212, separated by an exchange operator 1214. In this query plan, the actual hash join can be performed by three different worker threads. The scan of table 1, in accordance with the scan t1 operator 1206, can be performed by a single thread which writes every row of t1 into three different pipes (one for each of the threads performing the actual hash join). The three threads performing the hash join can build an identical private copy of a hash table with the rows of t1 and then scan a different partition of table t2 and lookup the values of the rows of t2 in the hash table to find matching rows of t1.

Further efficiency gains can be obtained by dividing the hash join processing across multiple operators. In this plan, the single thread that scans table t1 for scan operator t1 also builds a single hash table using the hash build operator 1212. This thread then writes a single row with the memory address of the hash table into the three pipes across the emit exchange operator and exchange operator 1214. Each of the three worker threads executing the hash join probe operator 1202 will read the rows of one partition of table t2 and lookup the corresponding values in the single shared hash table that was created in the hash build operator 1212. This has several advantages:

1. Only the memory address of the hash table needs to be passed across the pipes, not all of the rows of table t1, resulting in much less time spent writing and reading rows into and from pipe buffers.
2. No matter how many worker threads are executing the HashJoinProbeOp 1202, only a single hash table has to be built, instead of a hash table for each probing thread, resulting is a great reduction in memory resources used to hold the hash table(s).
3. If there is a bloom filter for the original hash join, because the bit vector build is always on the build op, it only needs to be built once and the same bit vector can then be used for probing during the multiple scans of t2 partitions.
4. In query plans with multiple hash join operations 1202, it is possible to build the various hash tables for each hash join in parallel, further reducing the execution time of the query plan.

Example Mobile Device

Figure 13:
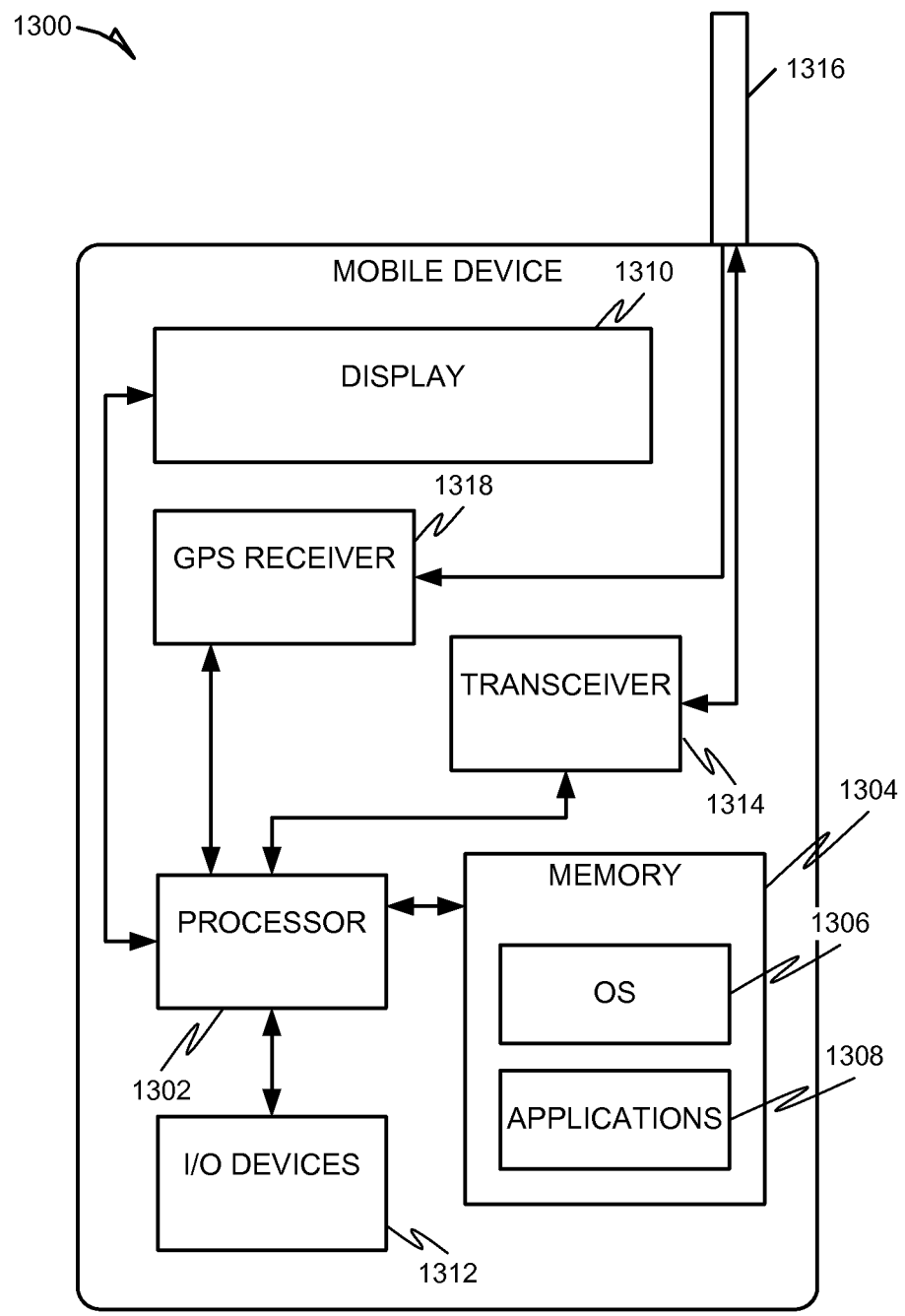
FIG. 13 is a block diagram illustrating a mobile device, according to an example embodiment.

FIG. 13 is a block diagram illustrating a mobile device 1300, according to an example embodiment. The mobile device 1300 can include a processor 1302. The processor 1302 can be any of a variety of different types of commercially available processors suitable for mobile devices 1300 (for example, an XScale architecture microprocessor, a Microprocessor without Interlocked Pipeline Stages (MIPS) architecture processor, or another type of processor). A memory 1304, such as a random access memory (RAM), a Flash memory, or other type of memory, is typically accessible to the processor 1302. The memory 1304 can be adapted to store an operating system (OS) 1306, as well as application programs 1308, such as a mobile location enabled application that can provide LBSs to a user. The processor 1302 can be coupled, either directly or via appropriate intermediary hardware, to a display 1310 and to one or more input/output (I/O) devices 1312, such as a keypad, a touch panel sensor, a microphone, and the like. Similarly, in some embodiments, the processor 1302 can be coupled to a transceiver 1314 that interfaces with an antenna 1316. The transceiver 1314 can be configured to both transmit and receive cellular network signals, wireless data signals, or other types of signals via the antenna 1316, depending on the nature of the mobile device 1300. Further, in some configurations, a GPS receiver 1318 can also make use of the antenna 1316 to receive GPS signals.

Modules, Components and Logic

Certain embodiments are described herein as including logic or a number of components, modules, or mechanisms. Modules can constitute either software modules (e.g., code embodied (1) on a non-transitory machine-readable medium or (2) in a transmission signal) or hardware-implemented modules. A hardware-implemented module is tangible unit capable of performing certain operations and can be configured or arranged in a certain manner. In example embodiments, one or more computer systems (e.g., a standalone, client or server computer system) or one or more processors can be configured by software (e.g., an application or application portion) as a hardware-implemented module that operates to perform certain operations as described herein.

In various embodiments, a hardware-implemented module can be implemented mechanically or electronically. For example, a hardware-implemented module can comprise dedicated circuitry or logic that is permanently configured (e.g., as a special-purpose processor, such as a field programmable gate array (FPGA) or an application-specific integrated circuit (ASIC)) to perform certain operations. A hardware-implemented module can also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) can be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor can be configured as respective different hardware-implemented modules at different times. Software can accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiple such hardware-implemented modules exist contemporaneously, communications can be achieved through signal transmission (e.g., over appropriate circuits and buses) that connect the hardware-implemented modules. In embodiments in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation and store the output of that operation in a memory device to which it is communicatively coupled. A further hardware-implemented module can then, at a later time, access the memory device to retrieve and process the stored output. Hardware-implemented modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one of processors or processor-implemented modules. The performance of certain of the operations can be distributed among the one or more processors, not only residing within a single machine, but deployed across a number of machines. In some example embodiments, the processor or processors can be located in a single location (e.g., within a home environment, an office environment or as a server farm), while in other embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the Internet) and via one or more appropriate interfaces (e.g., application program interfaces (APIs).)

Electronic Apparatus and System

Example embodiments can be implemented in digital electronic circuitry, or in computer hardware, firmware, software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry, e.g., a FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware can be a design choice. Below are set out hardware (e.g., machine) and software architectures that can be deployed, in various example embodiments.

Example Machine Architecture and Machine-Readable Medium

Figure 14:
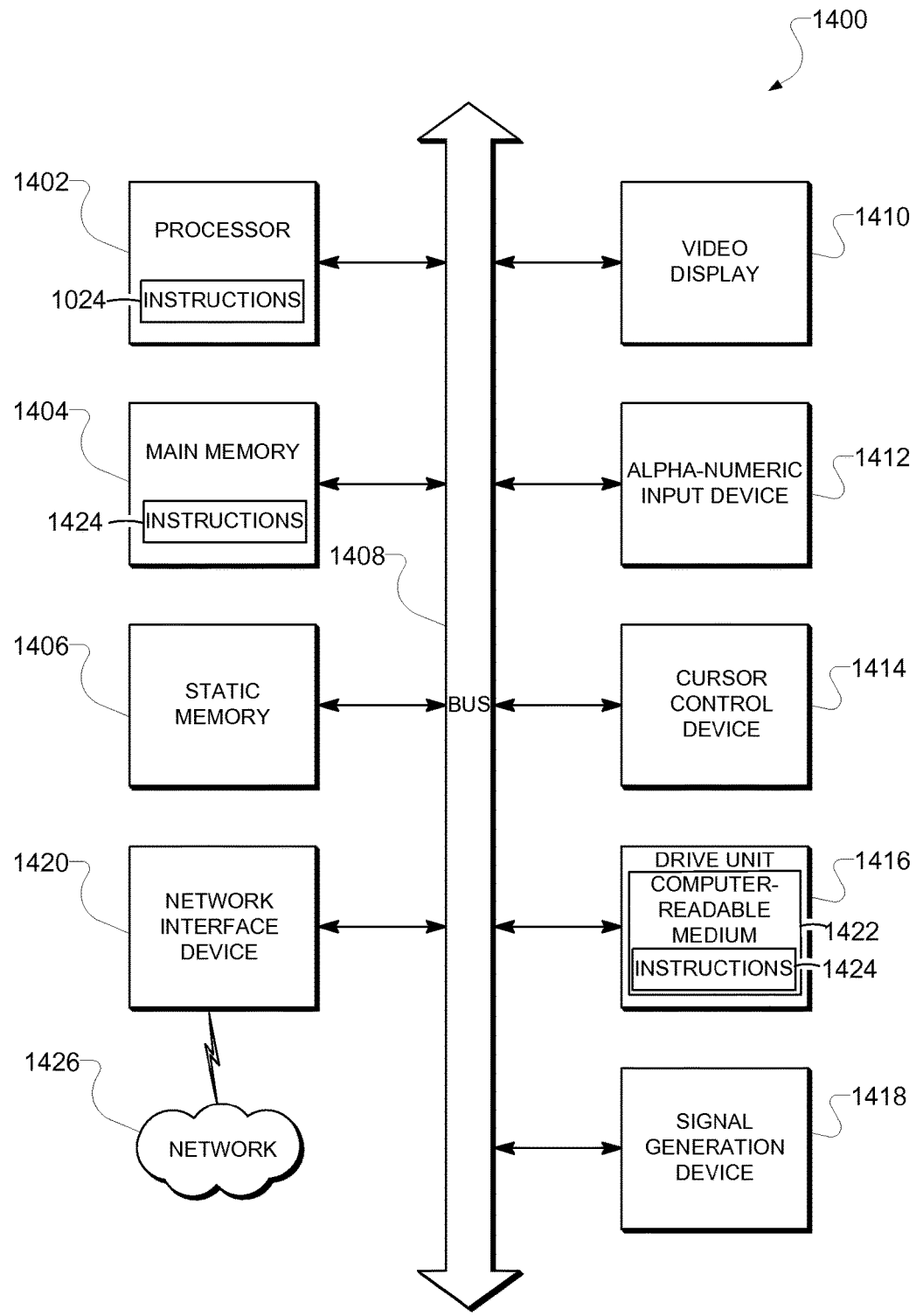
FIG. 14 is a block diagram of machine in the example form of a computer system within which instructions, for causing the machine to perform any one or more of the methodologies discussed herein, can be executed.

FIG. 14 is a block diagram of machine in the example form of a computer system 1400 within which instructions, for causing the machine to perform any one or more of the methodologies discussed herein, can be executed. In alternative embodiments, the machine operates as a standalone device or can be connected (e.g., networked) to other machines. In a networked deployment, the machine can operate in the capacity of a server or a client machine in server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor 1402 (e.g., a central processing unit (CPU), a graphics processing unit (GPU), or both), a main memory 1404 and a static memory 1406, which communicate with each other via a bus 1408. The computer system 1400 can further include a video display unit 1410 (e.g., a liquid crystal display (LCD) or a cathode ray tube (CRT)). The computer system 1400 also includes an alpha-numeric input device 1412 (e.g., a keyboard or a touch-sensitive display screen), a user interface (UI) navigation device 1414 (e.g., a mouse), a disk drive unit 1416, a signal generation device 1418 (e.g., a speaker), and a network interface device 1420.

Machine-Readable Medium

The disk drive unit 1416 includes a machine-readable medium 1422 on which is stored one or more sets of instructions and data structures (e.g., software) 1424 embodying or utilized by any one or more of the methodologies or functions described herein. The instructions 1424 can also reside, completely or at least partially, within the main memory 1404 and/or within the processor 1402 during execution thereof by the computer system 1400, with the main memory 1404 and the processor 1402 also constituting machine-readable media 1422.

While the machine-readable medium 1422 is shown in an example embodiment to be a single medium, the term "machine-readable medium" can include a single medium or multiple media (e.g., a centralized or distributed database, and/or associated caches and servers) that store the one or more instructions or data structures 1424. The term "machine-readable medium" shall also be taken to include any tangible medium that is capable of storing, encoding or carrying instructions 1424 for execution by the machine and that cause the machine to perform any one or more of the methodologies of the present disclosure, or that is capable of storing, encoding or carrying data structures utilized by or associated with such instructions 1424. The term "machine-readable medium" shall accordingly be taken to include, but not be limited to, solid-state memories, and optical and magnetic media. Specific examples of machine-readable media 1422 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1424 can further be transmitted or received over a communications network 1426 using a transmission medium. The instructions 1424 can be transmitted using the network interface device 1420 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1424 for execution by the machine, and includes digital or analog communications signals or other intangible media to facilitate communication of such software.

Although an embodiment has been described with reference to specific example embodiments, it will be evident that various modifications and changes can be made to these embodiments without departing from the broader spirit and scope of the disclosure. Accordingly, the specification and drawings are to be regarded in an illustrative rather than a restrictive sense. The accompanying drawings that form a part hereof, show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for optimizing a database query, comprising:
accessing a fact table and a plurality of dimension tables referenced by the database query;
creating a preliminary query plan based on the database query;
detecting that the database query involves a star join or snowflake join operation using the fact table and the plurality of dimension tables;

in response to detecting that the database query involves a star join or snowflake join operation:
  splitting a join operator in the preliminary query plan into a build operator and a probe operator;
  placing the probe operator in a final query plan in a same place as the join operator in the preliminary query plan; and
  placing the build operator beneath the probe operator in the final query plan.

2. The method of claim 1, further comprising executing the final query plan using a plurality of parallel threads by executing each build operator in the final query plan using a different thread.

3. The method of claim 1, wherein the build operator is placed between an exchange operator and the exchange operator's child from the preliminary query plan.

4. The method of claim 2, wherein the executing comprises passing a memory address of a hash table across the parallel threads without passing all rows of a dimension table.

5. The method of claim 2, wherein the executing comprises building a single hash table shared among the parallel probing threads independent of a number of the parallel threads.

6. The method of claim 2; when there is a bloom filter for the join operator, building a bit vector for the bloom filter once and using a same bit vector for probing during multiple scans of a fact table.

7. The method of claim 1, further comprising:
  determining a selectivity ratio for each of a plurality of dimension tables, wherein a lower value for the selectivity ratio indicates that a corresponding dimension table is more restrictive compared to other dimension tables in the plurality of dimension tables;
  creating a table ordering beginning with a fact table and continuing with each of the dimension tables in ascending order of the corresponding selectivity ratios of the dimension tables; and
  creating a query plan involving join operations between successive tables in the table ordering.

8. A system comprising:
  at least one processor;
  memory to store instructions that, when executed by the at least one processor cause the at least one processor to perform operations comprising:
  parsing a database query;
  normalizing the parsed database query;
  creating a preliminary query plan for the database query;
  detecting that the database query involves a star or snowflake join operation using a determined fact table and a plurality of dimension tables referenced by the database query; and
    in response to detection that the database query involves a star or snowflake join operation:
    splitting a join operator in the preliminary query plan into a build operator and a probe operator;
    placing the probe operator in a final query plan in the same place as the join operator in the preliminary query plan; and
    placing the build operator beneath the probe operator in the final query plan, between an exchange operator and the exchange operator's child from the preliminary query plan.

9. The system of claim 8, wherein the operations further comprise:
  determining a selectivity ratio for each of the plurality of dimension tables, the selectivity ratio having a lower value the more restrictive a corresponding dimension table is;
  creating a table ordering beginning with the fact table and continuing with each of the dimension tables in ascending order of their corresponding selectivity ratios; and
  creating the preliminary query plan involving join operations between successive tables in the table ordering.

10. The system of claim 8, wherein the operations further comprise:
  executing the final query plan using a plurality of parallel threads by executing each build operator in the final query plan using a different thread.

11. The system of claim 8, wherein the build operator is placed between an exchange operator and the exchange operator's child from the preliminary query plan.

12. The system of claim 10, wherein the executing comprises passing a memory address of a hash table across the parallel threads without passing all rows of a dimension table.

13. The system of claim 9, wherein the system is a relational database management system (RDBMS).

14. A non-transitory machine-readable storage medium comprising instructions, which when implemented by one or more machines, cause the one or more machines to perform operations comprising:
  accessing a fact table and a plurality of dimension tables referenced by the database query;
  creating a preliminary query plan based on the database query;
  detecting that the database query involves a star or snowflake join operation using the determined fact table and plurality of dimension tables;
  in response to detection that the database query involves a star or snowflake join operation:
    splitting a join operator in the preliminary query plan into a build operator and a probe operator;
    placing the probe operator in a final query plan in the same place as the join operator in the preliminary query plan; and
    placing the build operator beneath the probe operator in the final query plan.

15. The non-transitory machine-readable storage medium of claim 14, further comprising executing the query plan using a plurality of parallel threads by executing each build operator in the final query plan using a different thread.

16. The non-transitory machine-readable storage medium of claim 14, wherein the build operator is placed between an exchange operator and the exchange operator's child from the preliminary query plan.

17. The non-transitory machine-readable storage medium of claim 15, wherein the executing comprises passing a memory address of a hash table across the parallel threads without passing all rows of a dimension table.

18. The non-transitory machine-readable storage medium of claim 15, wherein the executing comprises building a single hash table shared among the parallel threads, no matter how many threads are used.

19. The non-transitory machine-readable storage medium of claim 15, when there is a bloom filter for the join operator, building a bit vector for the bloom filter only once and using the same bit vector for probing during multiple scans of a dimension table.

20. The non-transitory machine-readable storage medium of claim 14, further comprising:

determining a selectivity ratio for each of the plurality of dimension tables, the selectivity ratio having a lower value the more restrictive a corresponding dimension table is;

creating a table ordering beginning with the fact table and continuing with each of the dimension tables in ascending order of their corresponding selectivity ratios;

creating a query plan involving join operations between successive tables in the table ordering.

* * * * *